USU09823984B2

United States Patent
Sim

(10) Patent No.: US 9,823,984 B2
(45) Date of Patent: Nov. 21, 2017

(54) REMAPPING OF MEMORY IN MEMORY CONTROL ARCHITECTURES

(71) Applicant: Intel Corporation, Santa Clara, CA (US)

(72) Inventor: Leong Hock Sim, Bukit Mertajam (MY)

(73) Assignee: Intel Corporation, Santa Clara, CA (US)

(*) Notice: Subject to any disclaimer, the term of this patent is extended or adjusted under 35 U.S.C. 154(b) by 61 days.

(21) Appl. No.: 14/749,883

(22) Filed: Jun. 25, 2015

(65) Prior Publication Data

US 2016/0378620 A1 Dec. 29, 2016

(51) Int. Cl.
*G06F 11/00* (2006.01)
*G06F 11/16* (2006.01)
*G06F 11/20* (2006.01)
*G06F 11/14* (2006.01)

(52) U.S. Cl.
CPC ...... *G06F 11/1662* (2013.01); *G06F 11/1417* (2013.01); *G06F 11/2094* (2013.01); *G06F 2201/805* (2013.01); *G06F 2201/85* (2013.01)

(58) Field of Classification Search
USPC .................................................. 714/6.13, 6.1
See application file for complete search history.

(56) References Cited

U.S. PATENT DOCUMENTS

| | | | | |
|---|---|---|---|---|
| 2004/0139290 A1* | 7/2004 | Wolrich | ............ | G06F 12/0607 711/157 |
| 2008/0133968 A1* | 6/2008 | Muppirala | ............ | G06F 11/0778 714/13 |
| 2012/0236015 A1* | 9/2012 | Song | ............ | G09G 5/001 345/531 |
| 2012/0290868 A1* | 11/2012 | Gladwin | ............ | G06F 11/0727 714/4.1 |
| 2013/0077879 A1* | 3/2013 | Garcia | ............ | G01S 7/52 382/232 |
| 2015/0220399 A1* | 8/2015 | Lipman | ............ | H04L 47/26 714/18 |

* cited by examiner

*Primary Examiner* — Sarai Butler
(74) *Attorney, Agent, or Firm* — Lowenstein Sandler LLP

(57) ABSTRACT

In accordance with embodiments disclosed herein, there is provided systems and methods for remapping of memory in memory control architectures. A processing device includes a processing core and a platform controller hub (PCH) coupled to the processing core. The PCH is to receive an indication of a failure associated with a first memory region of a plurality of memory regions residing in a memory. The PCH is also to interrupt an operating system to prompt for a reboot. Upon the reboot, the PCH is to remap a memory address range associated with the first memory region to a second memory region of the plurality of regions.

20 Claims, 13 Drawing Sheets

300

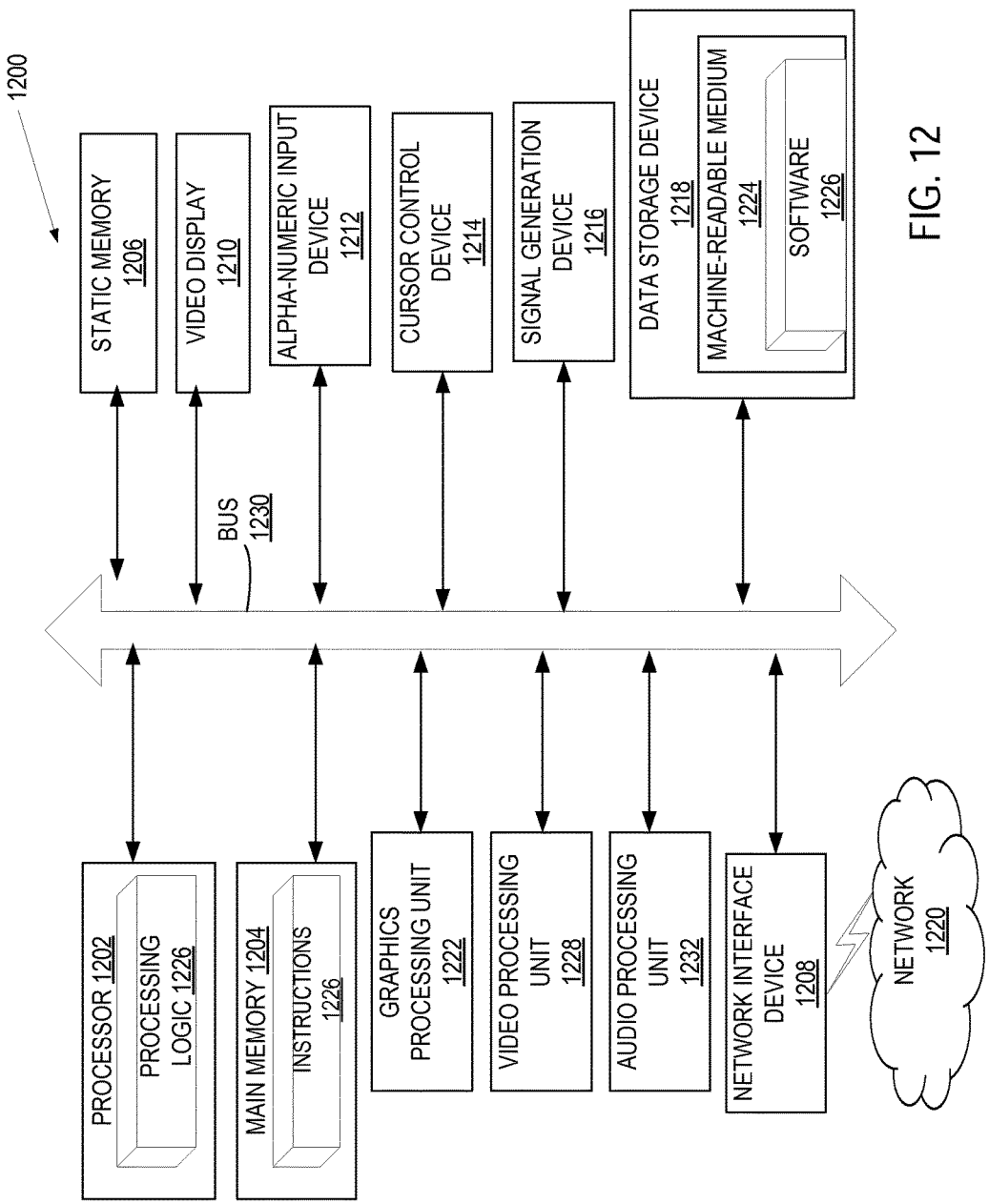

US 9,823,984 B2

REMAPPING OF MEMORY IN MEMORY CONTROL ARCHITECTURES

TECHNICAL FIELD

The present disclosure is generally related to computer systems, and is specifically related to systems and methods for remapping of memory in memory control architectures.

BACKGROUND

Memory control architectures function to coordinate computer memory by assigning portions called blocks (such as contiguous set of bytes) to various running programs and/or hardware module to optimize overall system performance. Memory control systems reside in hardware, in the operating system, and in programs and applications.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 12 illustrates a block diagram of one embodiment of a computer system.

DETAILED DESCRIPTION

Described herein are processing systems and related methods for remapping of memory in memory control architectures.

A memory region may be assigned to a peripheral device by a platform basic input output system (BIOS) during a peripheral component interconnect (PCI) enumeration phase. PCI bus is a parallel or serial synchronized computer bus for attaching physical devices, which may be in the form of an integrated circuit fitted onto the motherboard itself (called a planar device in the PCI specification) or in the form of an expansion card that fits into a slot installed on the motherboard. Examples of PCI cards used in personal computers and servers include: network cards, sound cards, modems, USB ports, TV tuner cards and disk controllers.

The PCI specification provides separate memory and I/O port address spaces for the devices connected to the bus. A third address space, called PCI configuration space, includes memory-mapped device registers that may be used by the PCI BIOS to query the device type and specifications of the system resources to be assigned to the device. At startup, the PCI BIOS may query the PCI devices via PCI configuration space to identify the devices that are present and determine what system resources each device needs. The PCI BIOS may then allocate the system resources (such as memory regions and/or interrupt lines).

In these common implementations, many of these memory regions that are allocated during the PCI enumeration phase are shared. However, various common implementations lack mechanism that would allow memory re-mapping upon detecting a failure in these memory regions.

Aspects of the present disclosure address the above-noted and other deficiencies by implementing a platform controller hub that may perform remapping of a memory address range to another physical memory region responsive to detecting a memory failure. In an illustrative example, a memory agent (such as a peripheral device) may diagnose a memory failure by performing a memory test. The memory agent may then notify, via an inter-processor communication channel, the platform controller hub of the detected memory failure. Responsive to receiving such a notification, the PCH may interrupt the operating system to prompt for reboot. Within the reboot sequence, the PCH may remap, to an unaffected new memory region, the memory address range associated with the defective memory region.

In certain implementations, upon receipt of an indication of the memory failure, the PCH increments a first counter of memory remap requests. In other implementations, upon completion of a memory remap, the PCH increments a second counter of completed memory remap operations.

Figure 1:
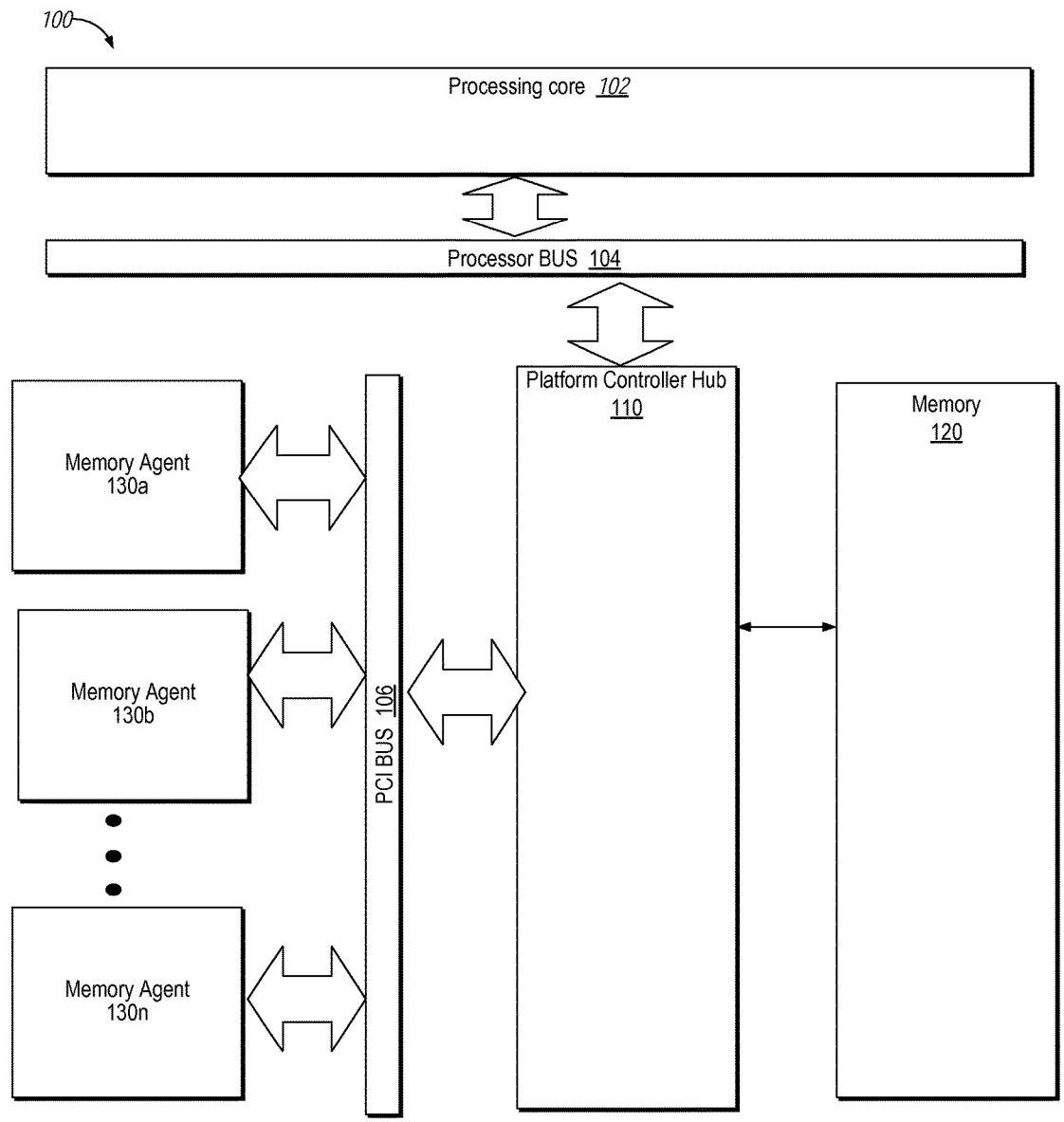
FIG. 1 illustrates a processing system according an embodiment of the present disclosure.

Referring to FIG. 1, shown is a high-level component diagram of an example processing system 100, in accordance with one or more aspects of the present disclosure. The processing system 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing system (hereinafter "system") 100 may include various components. In one embodiment, the processing system 100 may include one or more processing core(s) 102, coupled to a processor bus 104 that transmits data signals between processing core 102 and other components in the system 100.

The processing core(s) 102 may execute instructions of the processing system 100. The processing core(s) include, but are not limited to, pre-fetch logic to fetch instructions, decode logic to decode the instructions, execution logic to execute instructions and the like. The processing core 102 may be used with a computing system on a single integrated circuit (IC) chip of a computing system. One embodiment of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

The system 100 also includes a system logic chip 110 coupled to the processor bus 104 and a platform system memory (hereinafter "memory") 120 such as random access memory (SRAM) or dynamic random access memory (DRAM). The system logic chip 110 in the illustrated embodiment is a platform controller hub (PCH) 110. Processing core 102 can communicate to the PCH 110 via the processor bus 104. In some embodiments, the PCH 110 may be coupled to a plurality of memory agents 130*a*-130*n* via an inter-processor communication channel such as a peripheral control interconnect (PCI) bus 106. As discussed above, a PCI bus is a parallel synchronized computer bus for attaching physical devices, which may be in the form of an integrated circuit fitted onto the motherboard itself (called a planar device in the PCI specification) or in the form of an expansion card that fits into a slot installed on the motherboard. Examples of PCI cards used in personal computers and servers include: network cards, sound cards, modems, USB ports, TV tuner cards and disk controllers.

In one embodiment, the memory agent 130 performs a memory test and detects a memory failure in a memory region in the memory 120. The failure may be detected upon access of the memory region previously allocated in the memory 120. The memory agent 130 would notify the PCH 110 of this memory failure. In one embodiment, the PCH 110 is configured to allocate a region in the memory 120 upon system reboot or boot. In one embodiment, upon receipt of the notification of the memory failure, the PCH 110 generates a request to remap a memory address range associated with the failed memory region to a new memory region, which is unaffected by any failure. The In another embodiment, the PCH 110 records the remap request. The PCH 110 may interrupt the system to prompt for a reboot.

In one embodiment, upon the system reboot, the PCH 110 determines that there is an outstanding request to remap the memory region. Upon this determination, the PCH 110 checks the memory 120 to determine whether there is another memory region that is unaffected. In one embodiment, the memory region that does not have any history of failure is determined to be unaffected. In one embodiment, the PCH 110 performs a remap operation by remapping a memory address range associated with failed memory region to the unaffected memory region in the memory 120. In another embodiment, the PCH 110 records the completion of this remap operation.

In one embodiment, the PCH 110 counts a number of remap operation completions and compare this number with a maximum allowed number of remap operations. In one embodiment, the PCH 110 continues with the remapping upon the next system reboot when the count is less than the maximum allowed number of remaps operations. In another embodiment, the PCH 110 stops the remapping upon the next system reboot when the count is greater than or equal to the maximum allowed number of remap operations.

Figure 2:
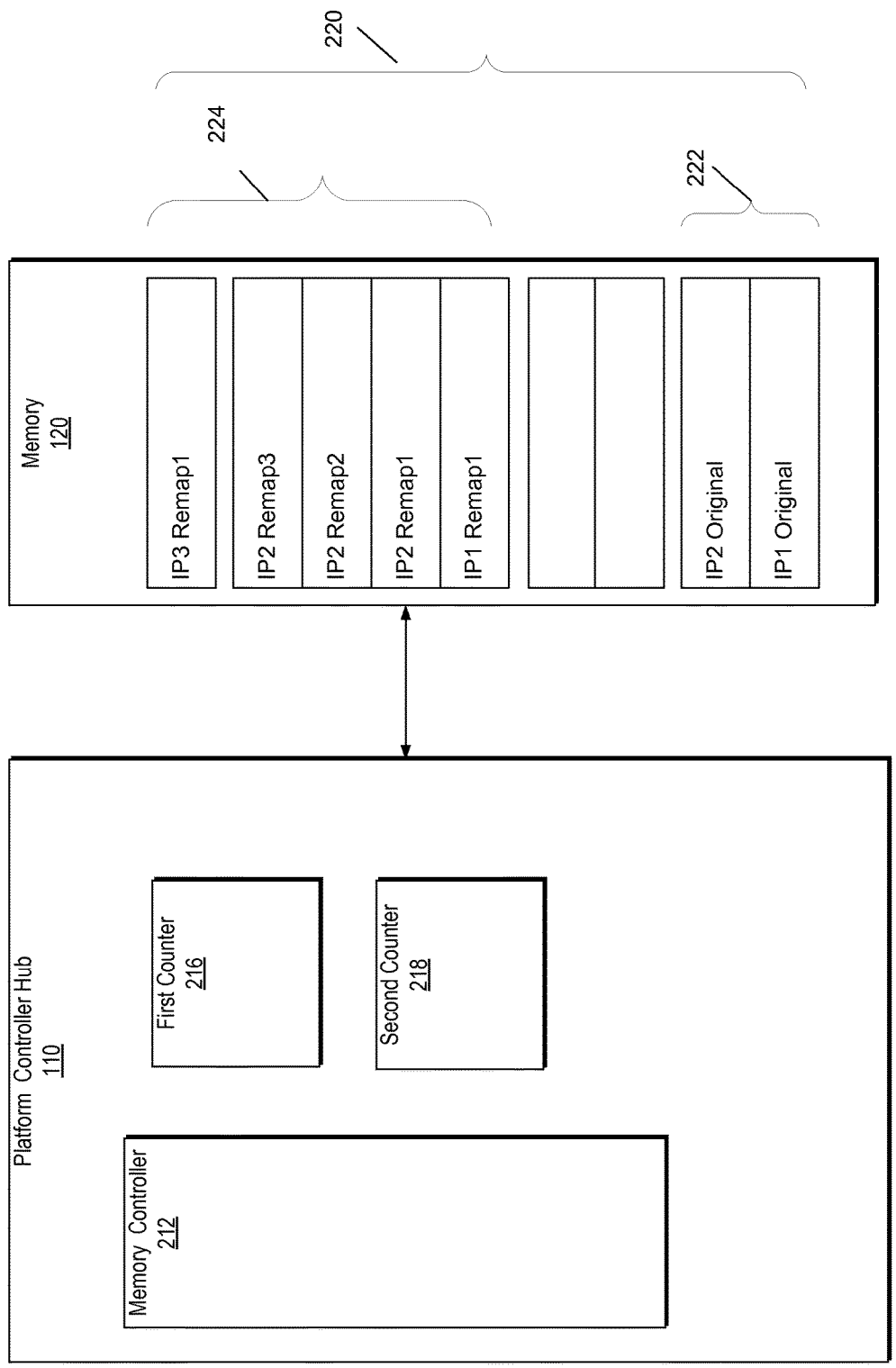
FIG. 2 illustrates a detailed block diagram of components of the processing system according to an embodiment of the present disclosure.

Referring to FIG. 2, shown is a detailed diagram of the PCH 110, and the memory 120 of the processing system 100 of FIG. 1.

In one embodiment, as shown the memory 120 is divided into memory regions 220 illustrating both original memory regions 222 allocated upon initial boot of the system and remapped memory regions 224 as described in greater detail herein-below. As an example, IP2 Original, IP1 Original are original memory regions 222, and IP3 Remap1, IP2 Remap3, IP2 Remap2, IP2 Remap1 and IP1 Remap1 are the remapped memory regions 224.

In one embodiment, the PCH 110 includes a memory controller 212, a first counter 216 and a second counter 218. In one embodiment, the memory controller 212 stores an identifier of each of the memory regions 220. In one embodiment, the identifier identifies memory address range associated with each of the memory regions 220. In one embodiment, the first counter 216 counts the number of memory remap requests recorded by the memory controller 212, details of which are described herein below. In one embodiment, the second counter 218 counts number of remap operations completed by the memory controller 212, details of which are described herein below.

In one embodiment, the memory controller 212 is configured to remap the original memory regions 222 in the memory 110 to the remapped memory regions 224 in the memory 110. In one embodiment, the memory controller 212 receives a notification of failure associated with the original memory region 222. As discussed above, in one embodiment, the notification of the failure is sent by a memory agent such as the memory agent 130 in FIG. 1. In one embodiment, the memory controller 212 generates a request to remap the failed original memory region 222 and records the request to remap In one embodiment, the memory controller increments the first counter 216 upon receipt of the notification of the failure. The first counter 216 counts number of remap requests. A value of the first counter 216 is initially set to a 0 upon initial boot of the system. The value of the first counter 216 is increased by an increment of 1 upon each count of the remap request.

In one embodiment, memory controller 212 interrupts the system to prompt for a reboot. Upon the reboot of the system, the memory controller 212 checks the first counter to determine if the value of the first counter is greater than 0. If the value of the count is greater than 0, then the memory controller 212 determines whether there is another region in the memory 120 that is unaffected to remap a memory address range associated with the failed memory region. In one embodiment, the memory controller 112 checks a second counter 218 to determine the count of completed remap operations. In one embodiment, the memory controller 212 compares the completed remap operations count from the second counter 218 to a maximum allowed number of remap operations. In one embodiment, the maximum allowed number of the remap operations, is determined based on the memory regions 220 in the memory 120 that are unaffected. In one embodiment, the memory region 220 determined to be unaffected in the memory 120 does not have any history of failure. When, the memory controller 212 determines that the completed remap operations count in the second counter is less than the maximum allowed number of remap operations, then the memory controller 212 performs a remap operation by remapping a memory address range associated with the failed original memory region 222 to another memory region identified as a remapped memory region 224. Upon, this completion of the remap operation, the PCH increments the second counter 218.

In one embodiment, the memory controller 210 continues with the remapping of a failed memory region upon the next system reboot when the value of the first counter is greater than 0 and when the value of the second counter 218 is less than the maximum allowed number of remaps operations. In another embodiment, the memory controller 210 continues to detect for next system reboot when the value of the first counter upon the previous system reboot is set to 0. In another embodiment, the memory controller 212 stops the remapping of the failed memory region upon the next system reboot when the value of the first counter is greater than 0 and when the count of the second counter 218 is greater than or equal to the maximum allowed number of remap operations.

Figure 3:
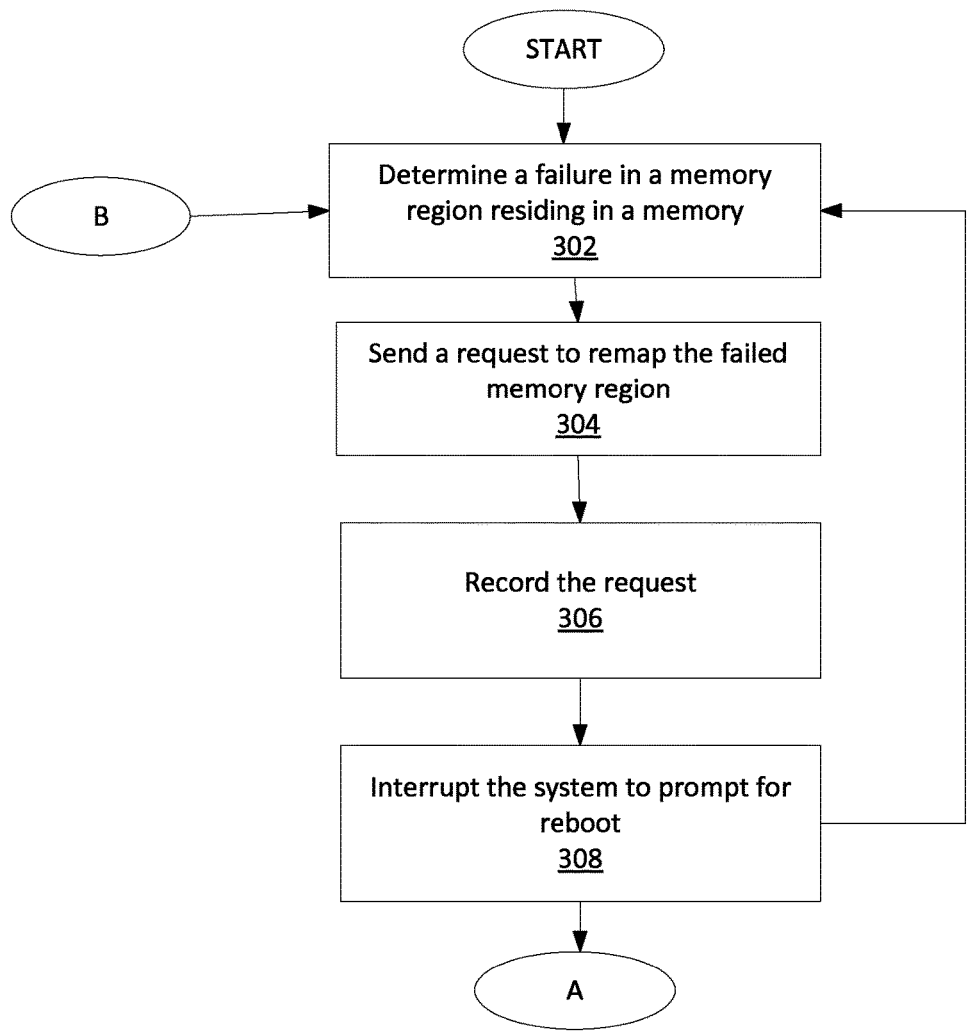
FIG. 3 is a flow diagram of a method of remapping of memory in memory control architecture according to an embodiment of the present disclosure.

FIG. 3 is a flow diagram of a method of remapping of a memory in memory control architectures by a memory control unit according to an embodiment of the present disclosure. Method 300 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 300 may be performed, in part, by processing logics of any one of processing cores 102 executing an operating system with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 302, the processing logic determines a failure in a memory region residing in a memory. In one embodiment, a memory region in the memory is allocated originally upon initial system boot. At block 304, the processing logic sends a request to remap the failed memory region. At block 306, the processing logic records the remap request. In one embodiment, the processing logic includes a first counter to count the memory remap requests. In one embodiment, a value of the first counter is set to 0 upon initial boot of the system. In one embodiment, the value of the first counter is increments by a 1 upon notification of failure on reboot. At block 308, the processing logic interrupts the system to prompt for a reboot. The method 300 is repeated at block 302 to determine a failure in another memory region residing in the memory. In one embodiment, a method 400 to remap the memory is processed after the block 308 as described in FIG. 4 herein below.

Figure 4:
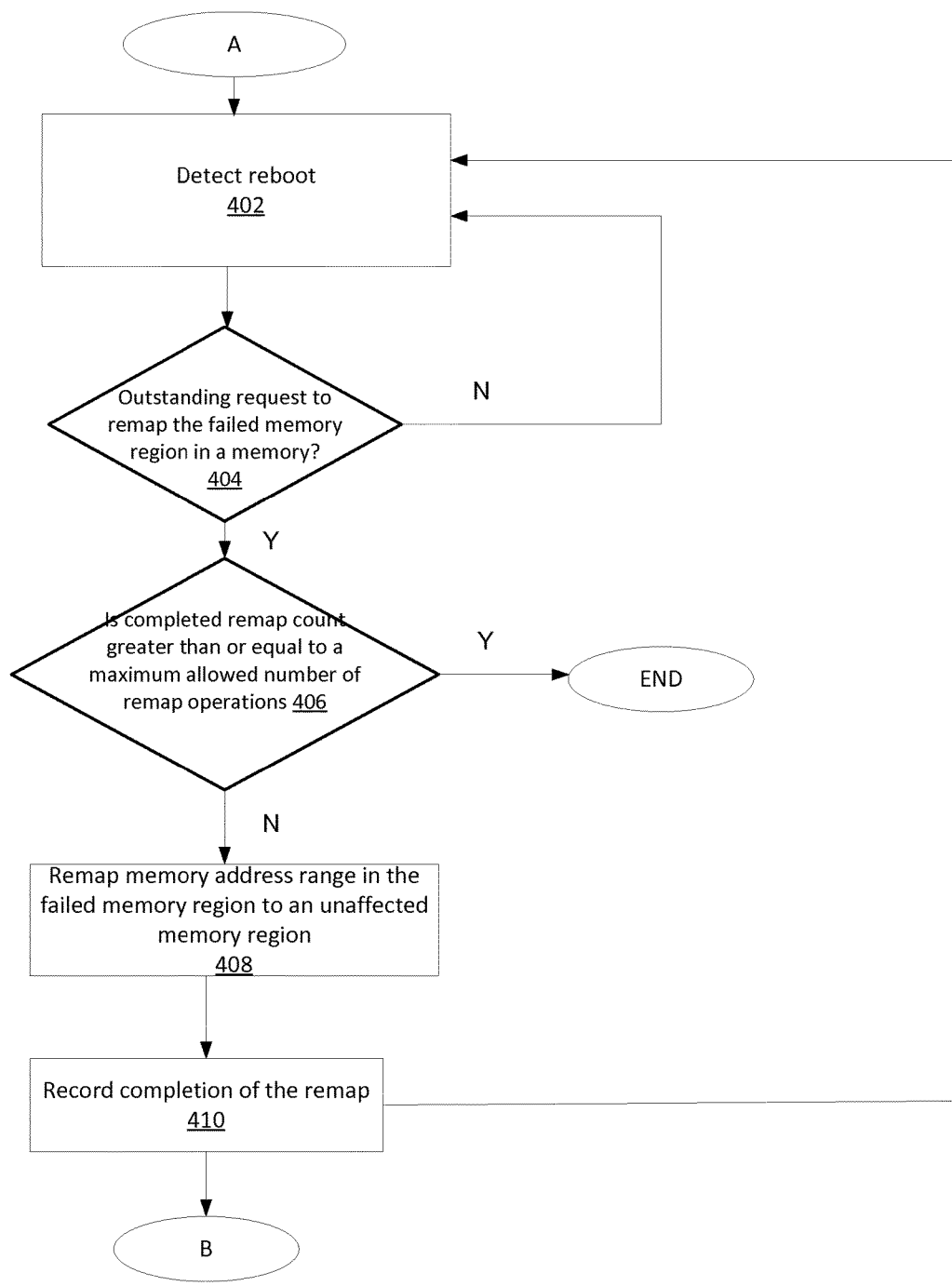
FIG. 4 is a flow diagram of a method of remapping of memory in memory control architecture according to an embodiment of the present disclosure.

FIG. 4 is a flow diagram of a method of remapping of a memory in memory control architectures by a memory control unit according to an embodiment of the present disclosure. Method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 400 may be performed, in part, by processing logics of any one of processing cores 102 executing an operating system with respect to FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 402, the processing logic detects a system reboot. At block 404, the processing logic determines whether there is an outstanding request to remap the failed memory region in the memory. In one embodiment, the processing logic checks a first counter to determine whether there is the outstanding remap request. As discussed above, value of the first counter will be set to 0 upon initial boot of the system and will be incremented upon a count of 1 upon every remap request. When at block 404, it is determined that there is no outstanding request to remap, then block 402 is repeated to detect for another system reboot. When at block 404, it is determined that there is an outstanding request to remap, then at block 406, the processing logic determines whether the completed remap operation counts (in the second counter) is greater than or equal to the maximum allowed number of remap operations. In one embodiment, the maximum number of the remap operations is determined based on the memory regions in the memory that are unaffected. In one embodiment, the memory region determined to be unaffected in the memory that does not have any history of failure.

When at block 406, it is determined that the completed remap count is not greater than or equal to the maximum allowed number of remap operations, then at block 408, the processing logic remaps a memory address range associated with the failed memory region to an unaffected memory region in the memory. At block 410, the completion of the remap is recorded. In one embodiment, the completion of remaps operations is counted by the second counter. The method 400 is repeated starting at block 402 to detect for another reboot. In one embodiment, the method 300 to remap the memory is processed after the block 410 starting with block 302 as described in FIG. 3 above. Returning back to block 406, when it is determined that that the completed remap count is greater than or equal to the maximum allowed number of remap operations, the process ends.

Figure 5A:
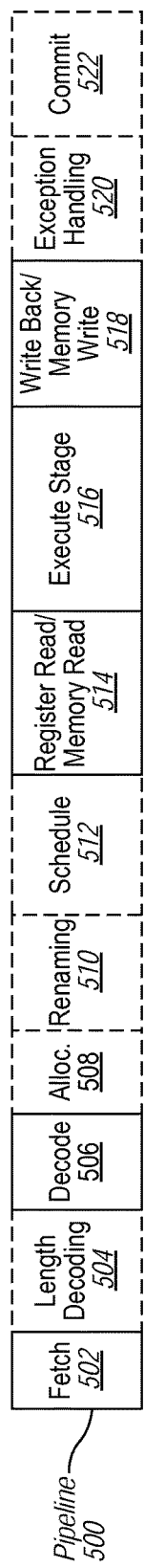
FIG. 5A is a block diagram illustrating a micro-architecture for a processor in which one embodiment of the disclosure may be used.

FIG. 5A is a block diagram illustrating an in-order pipeline and a register renaming stage, out-of-order issue/execution pipeline implemented by processing device 500 according to some embodiments of the disclosure. The solid lined boxes in FIG. 5A illustrate an in-order pipeline, while the dashed lined boxes illustrates a register renaming, out-oforder issue/execution pipeline. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5A.

Figure 5B:
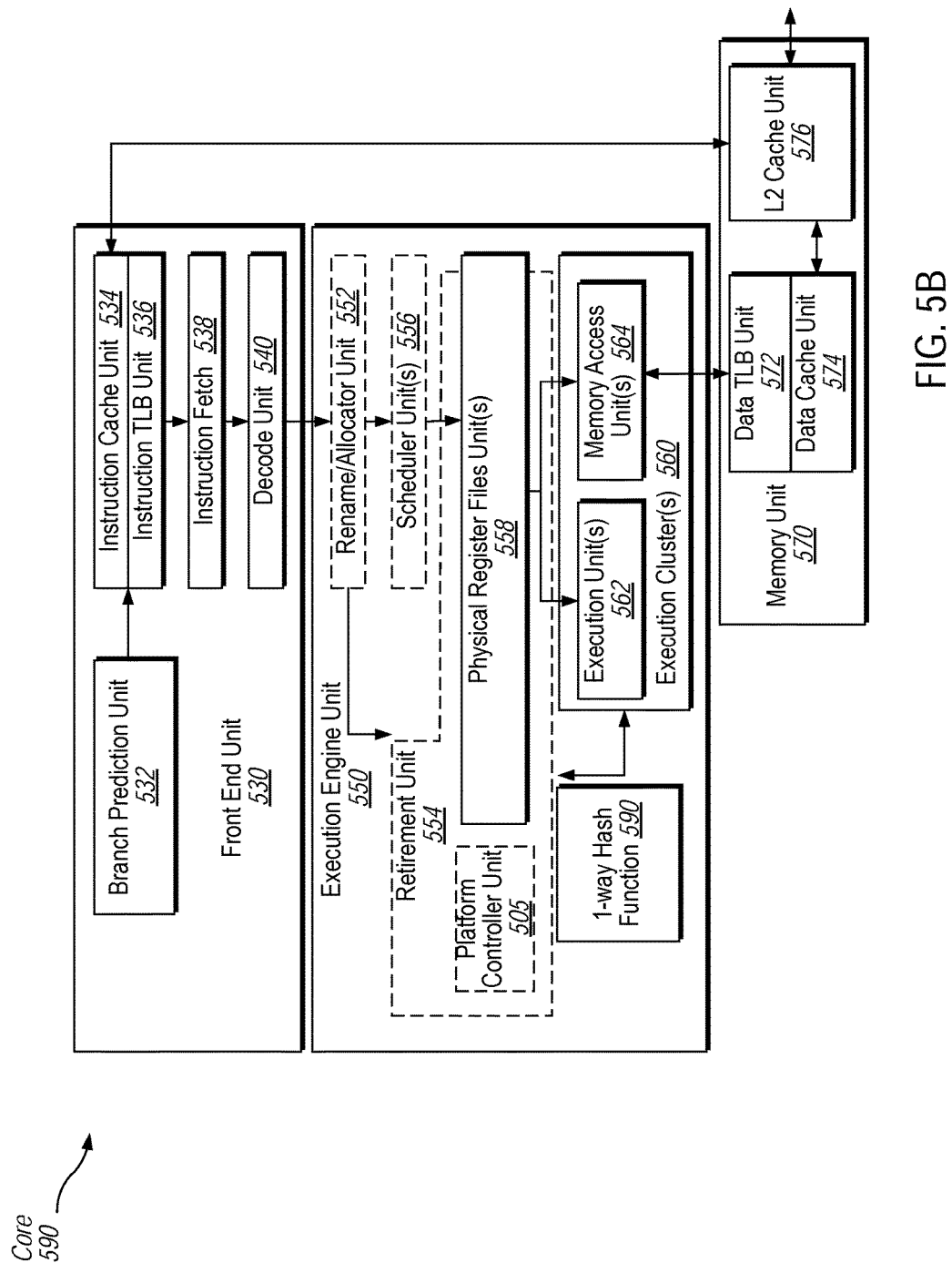
FIG. 5B is a block diagram illustrating an in-order pipeline and a register renaming stage, out-of-order issue/execution pipeline implemented according to at least one embodiment of the disclosure.

FIG. 5B is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The retirement unit 554 may include a platform controller unit 505 to remap memory in memory control architectures according to embodiments of the invention. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
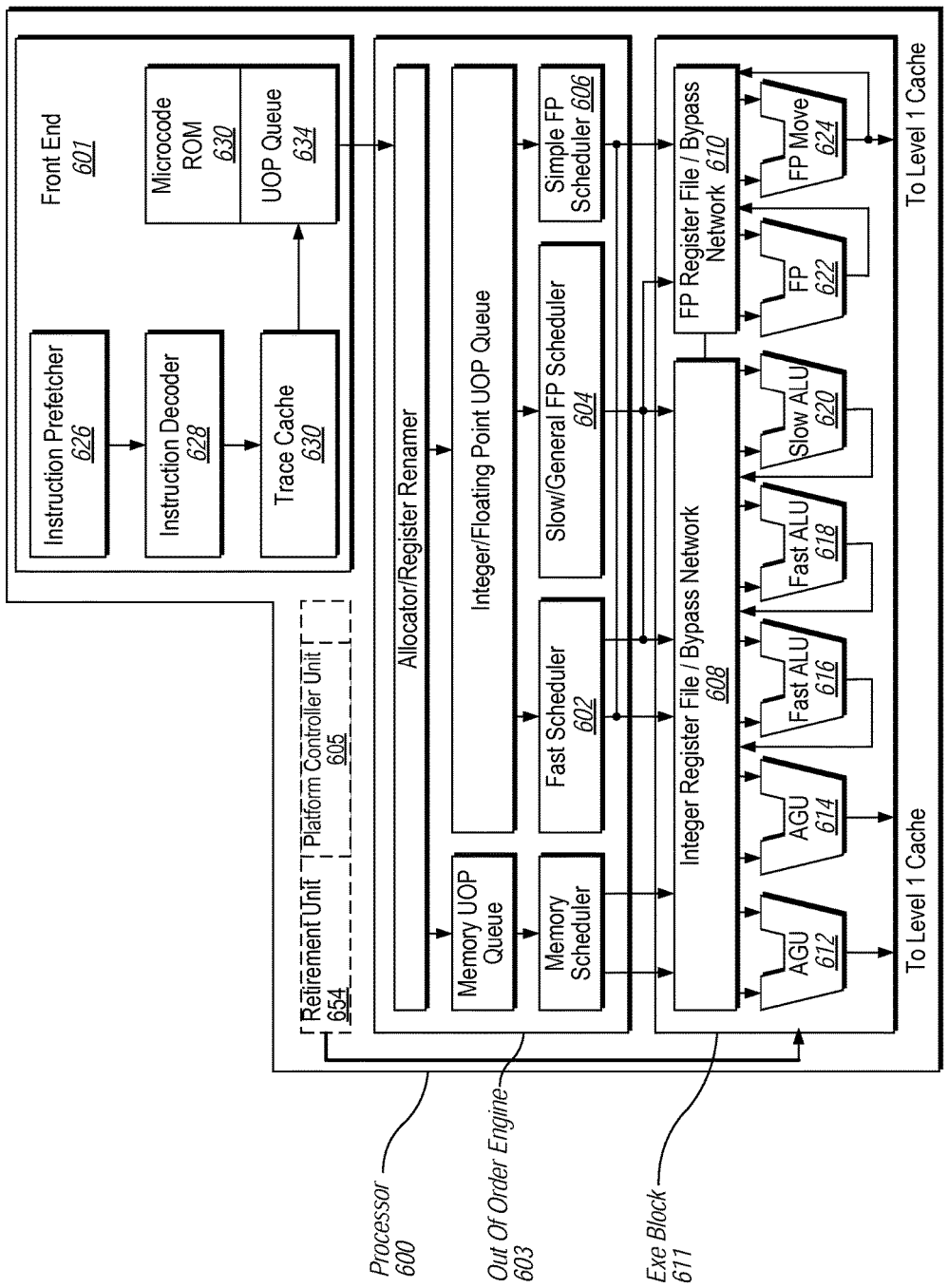
FIG. 6 illustrates a block diagram of the micro-architecture for a processor in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The processor 600 may include a retirement unit 654 coupled to the execution block 611. The retirement unit 654 may include a platform controller unit 605 to access control for a memory protection key architecture according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
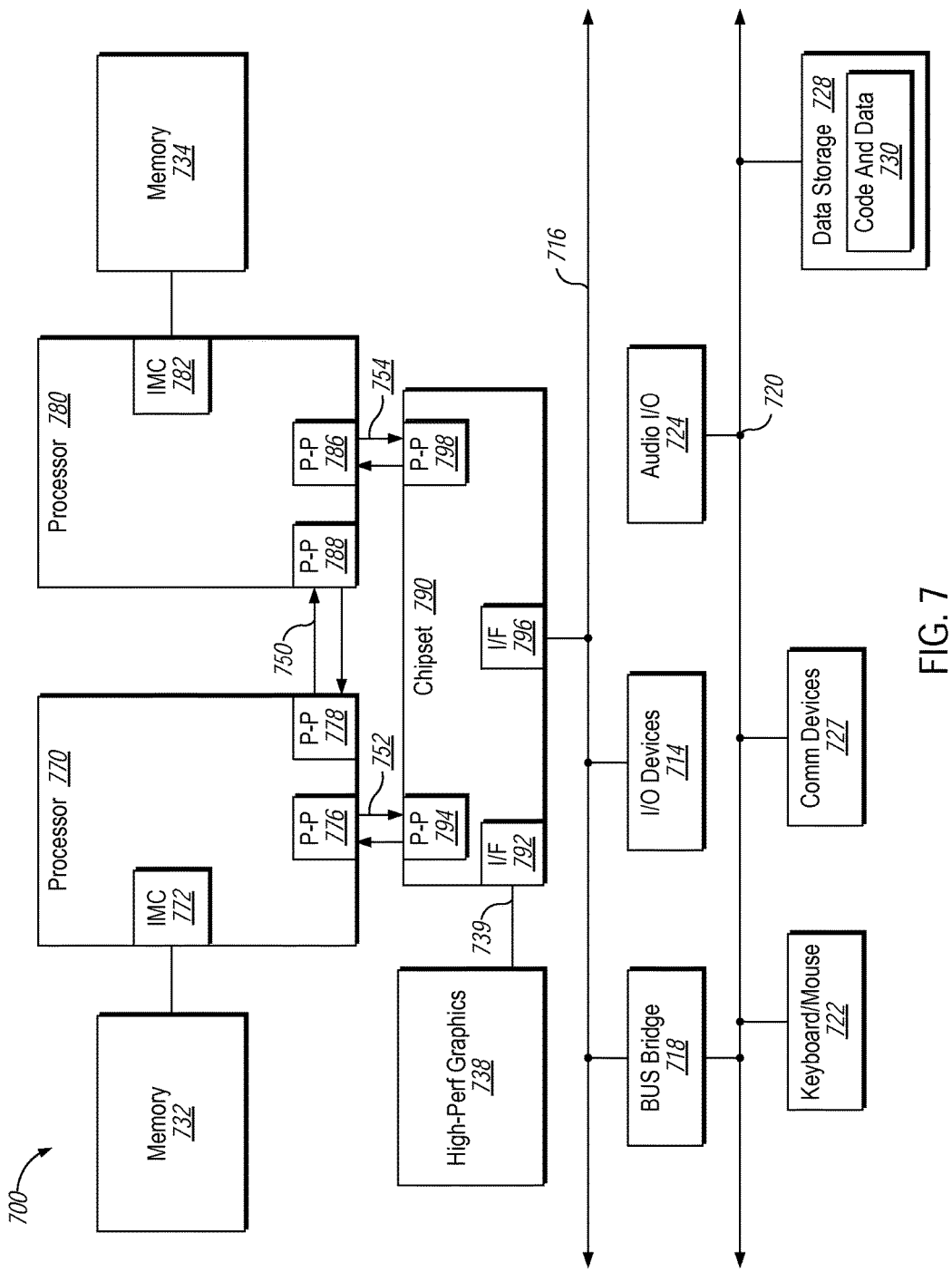
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
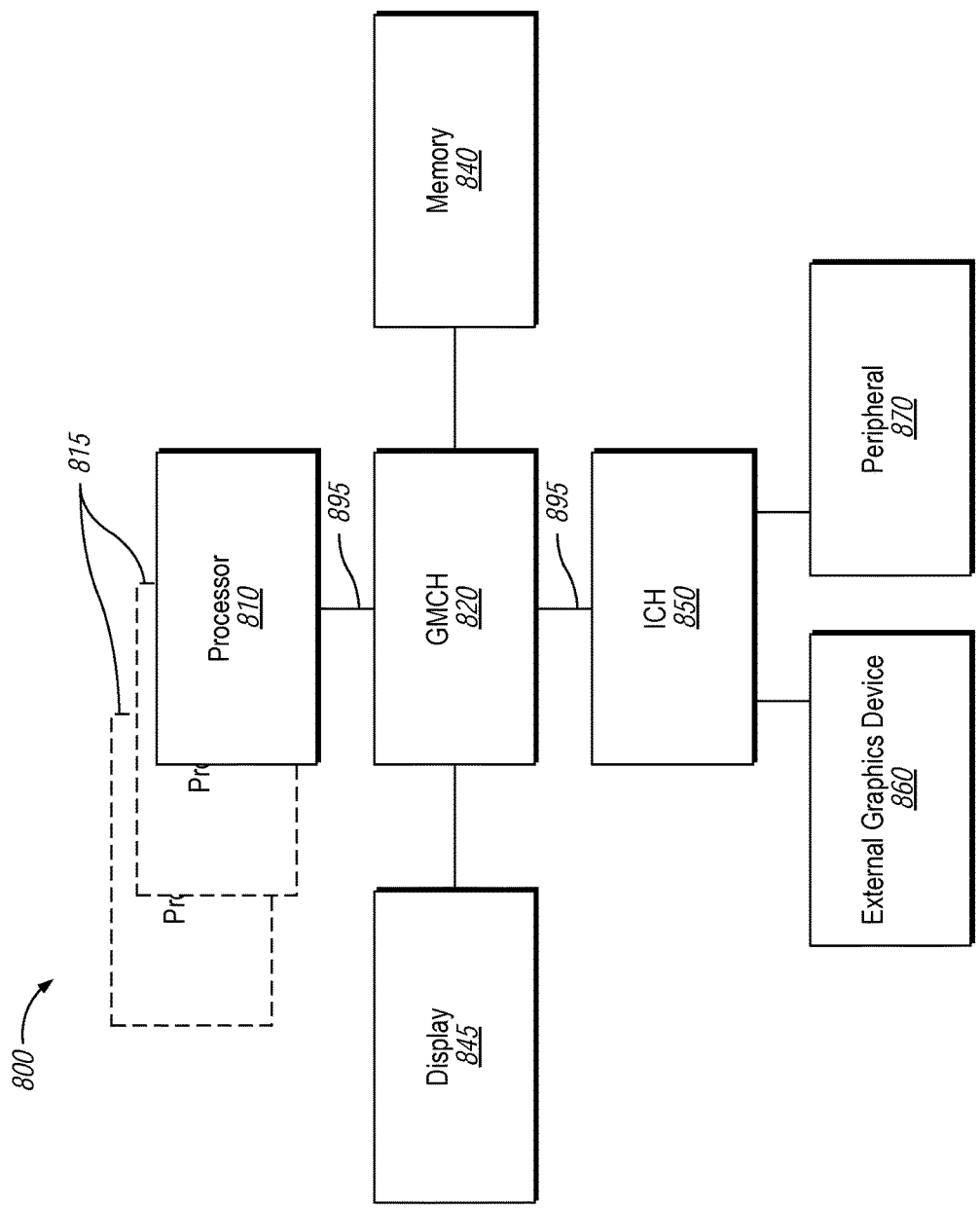
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GPCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GPCH 820 may be coupled to a memory 840 that may be, for example, a dynamic random access memory (DRAM). The DRAM may, for at least one embodiment, be associated with a non-volatile cache.

The GPCH 820 may be a chipset, or a portion of a chipset. The GPCH 820 may communicate with the processor(s) 810, 815 and control interaction between the processor(s) 810, 815 and memory 840. The GPCH 820 may also act as an accelerated bus interface between the processor(s) 810, 815 and other elements of the system 800. For at least one embodiment, the GPCH 820 communicates with the processor(s) 810, 815 via a multi-drop bus, such as a frontside bus (FSB) 895.

Furthermore, GPCH 820 is coupled to a display 845 (such as a flat panel or touchscreen display). GPCH 820 may include an integrated graphics accelerator. GPCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
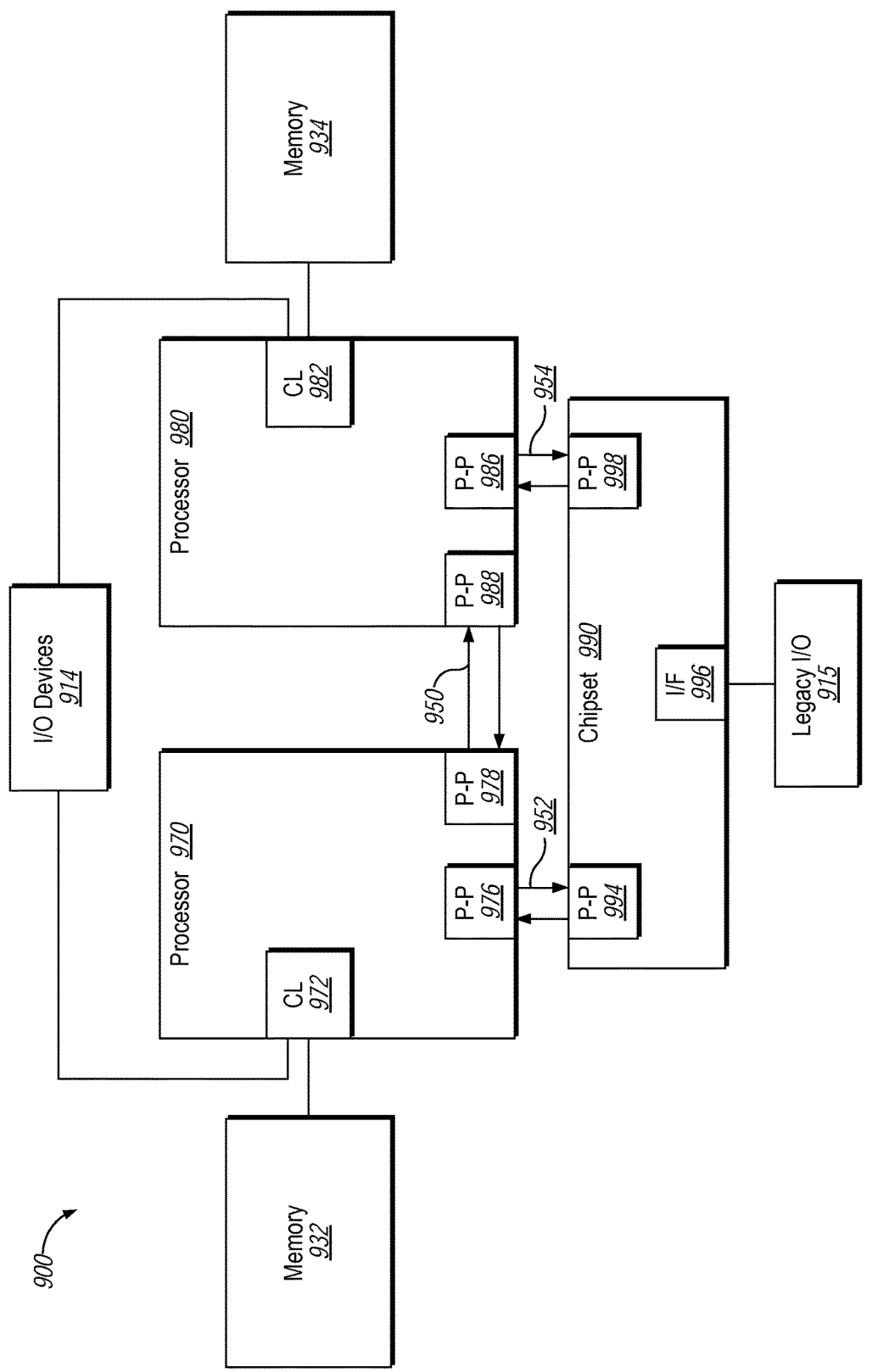
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
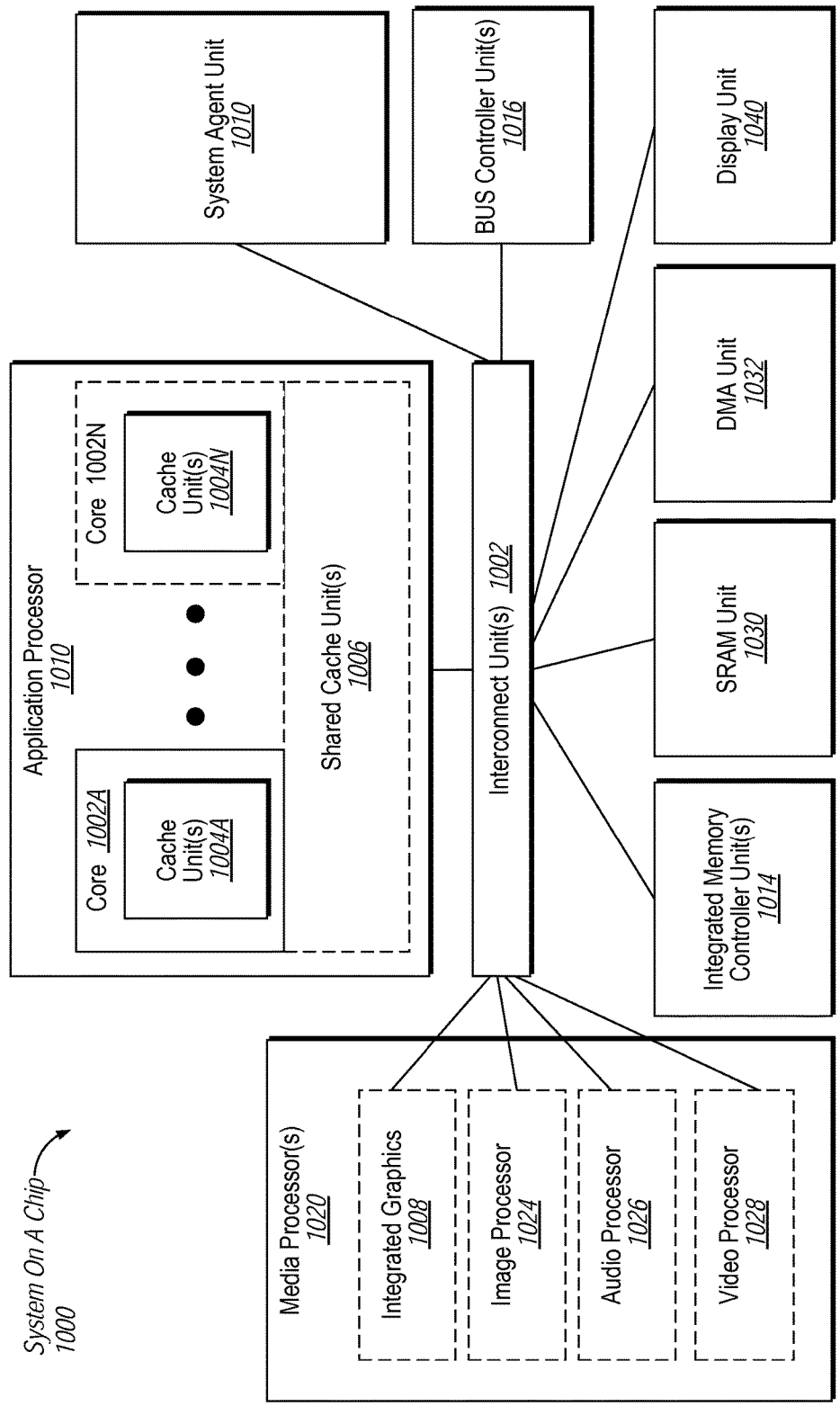
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
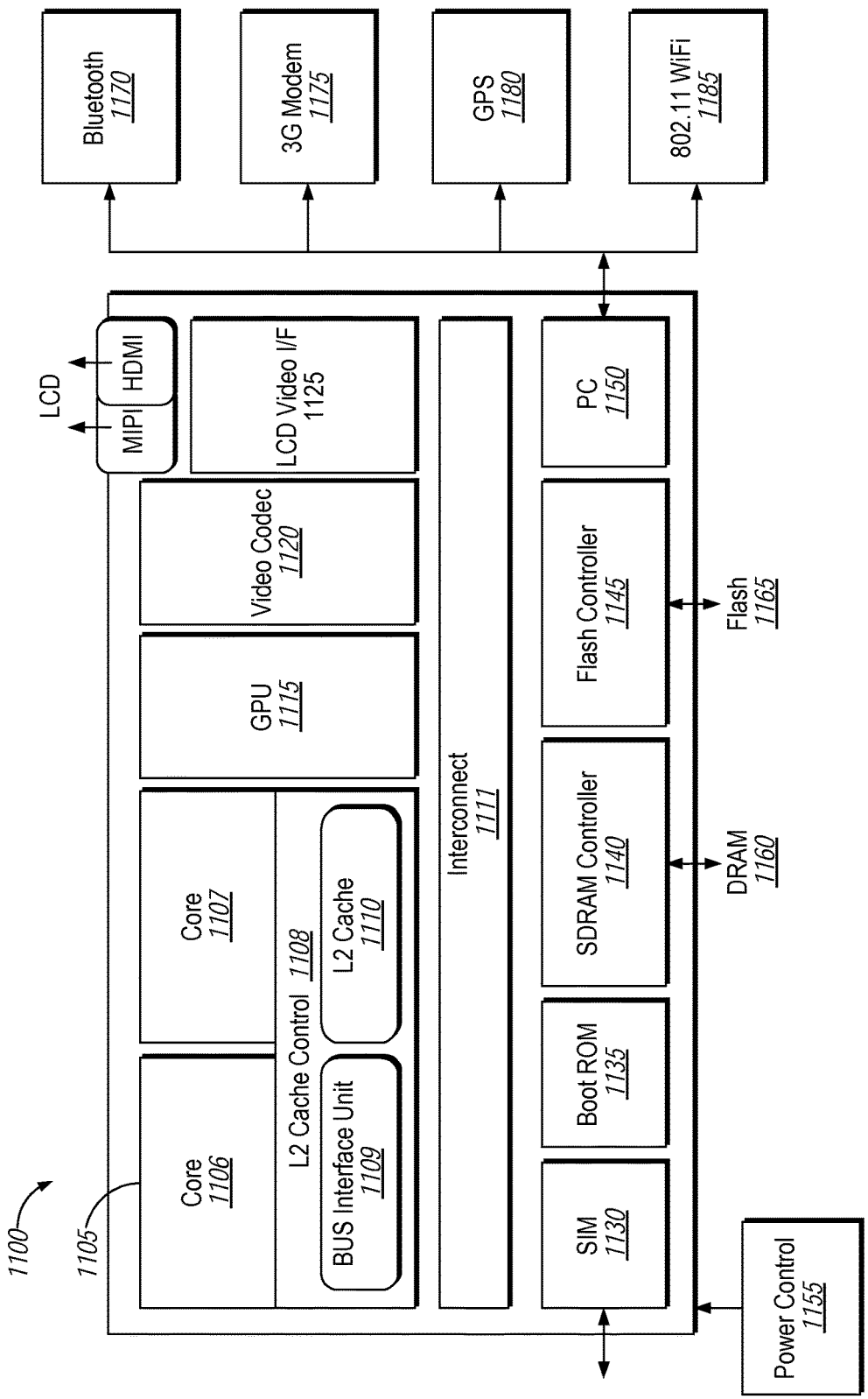
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processing device comprising a processing core and a platform controller hub (PCH) coupled to the processing core, the PCH to receive an indication of a failure associated with a first memory region of a plurality of memory regions residing in a memory; interrupt an operating system to prompt for a reboot; and upon the reboot, remap a memory address range associated with the first memory region to a second memory region of the plurality of regions.

In Example 2, the subject matter of Example 1 can optionally include wherein the PCH is to store an identifier of each of the plurality of the memory regions in the memory, wherein the identifier identifies the memory address range associated with each of the plurality of memory regions.

In Example 3, the subject matter of any one of Examples 1-2 can optionally include wherein upon receipt of the indication of failure, the PCH is to record a request to remap the first memory region in the memory.

In Example 4, the subject matter of any one of Examples 1-3 can optionally include wherein upon receipt of the indication of failure, the PCH is to increment a first counter of memory remap requests.

In Example 5, the subject matter of any one of Examples 1-4 can optionally include wherein responsive to remapping the memory address range, the PCH is to increment a second counter of completed memory remap operations.

In Example 6, the subject matter of any one of Examples 1-5 can optionally include wherein the PCH is to compare the second counter to a maximum allowed number of remap operations.

In Example 7, the subject matter of any one of Examples 1-6 can optionally include wherein the PCH is to continue with the remapping of the memory address range associated with a memory region among the plurality of regions when the completed memory remap operations count from the second counter is less than the maximum allowed number of remap operations.

In Example 8, the subject matter of any one of Examples 1-7 can optionally include wherein the PCH is to stop the remap of the memory address range associated with a memory region among the plurality of regions when the completed memory remap operations count from the second counter is greater than or equal to the maximum allowed of remap operations.

Example 9 is a system-on-a chip (SoC) comprising a memory and a processing device communicatively coupled to the memory the processing device comprising a processing core and a platform controller hub (PCH) coupled to the processing core, the PCH to receive an indication of a failure associated with a first memory region of a plurality of memory regions residing in the memory; interrupt an operating system to prompt for a reboot; and upon the reboot, remap a memory address range associated with the first memory region to a second memory region of the plurality of regions.

In Example 10, the subject matter of Example 9 can optionally include wherein the PCH is to store an identifier of each of the plurality of the memory regions in the memory, wherein the identifier identifies the memory address range associated with each of the plurality of memory regions.

Example 11 is a method comprising receiving an indication of a failure associated with a first memory region of a plurality of regions residing in a memory; interrupting an operating system to prompt for a reboot; and upon the reboot, remapping a memory address range associated with the first memory region to a second memory region of the plurality of regions.

In Example 12, the subject matter of Example 11 can optionally include comprising storing an identifier of each of the plurality of the memory regions in the memory, wherein the identifier identifies the memory address range associated with each of the plurality of memory regions.

In Example 13, the subject matter of any one of Examples 11-12 can optionally include wherein upon receipt of the indication of failure, recording a request to remap the first memory region in the memory.

In Example 14, the subject matter of any one of Examples 11-13 can optionally include wherein upon receipt of the indication of failure, incrementing a first counter of memory remap requests.

In Example 15, the subject matter of any one of Examples 11-14 can optionally include in response to remapping the memory address range, incrementing a second counter of completed memory remap operations.

Example 16 is a non-transitory machine-readable storage medium including data that, when accessed by a processing device, cause the processing device to perform operations comprising receiving an indication of a failure associated with a first memory region of a plurality of regions residing in a memory; interrupting an operating system to prompt for a reboot; and upon the reboot, remapping a memory address range associated with the first memory region to a second memory region of the plurality of regions.

In Example 17, the subject matter of Example 16 can optionally include wherein the operations further comprising storing an identifier of each of the plurality of the memory regions in the memory, wherein the identifier identifies the memory address range associated with each of the plurality of memory regions.

In Example 18, the subject matter of any one of Examples 16-17 can optionally include wherein upon receipt of the indication of failure, the operations further comprising recording a request to remap the first memory region in the memory.

In Example 19, the subject matter of any one of Examples 16-18 can optionally include wherein upon receipt of the indication of failure, the operations further comprising incrementing a first counter of memory remap requests.

In Example 20, the subject matter of any one of Examples 16-19 can optionally include wherein the operations further comprising incrementing a second counter of completed memory remap operations.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a processing core; and
a platform controller hub (PCH) coupled to the processing core, the PCH to:
receive an indication of a failure associated with a first memory region of a plurality of memory regions residing in a memory;
generate a request to remap the first memory region;
interrupt, based on the request to remap, an operating system to prompt for a reboot; and
responsive to occurrence of the reboot, remap a memory address range associated with the first memory region to a second memory region of the plurality of regions.

2. The processing device of claim 1, wherein the PCH is to store an identifier of each of the plurality of the memory regions in the memory, wherein the identifier identifies the memory address range associated with each of the plurality of memory regions.

3. The processing device of claim 1, wherein upon receipt of the indication of failure, the PCH is to record the request to remap the first memory region in the memory.

4. The processing device of claim 1, wherein upon receipt of the indication of failure, the PCH is to increment a first counter of memory remap requests.

5. The processing device of claim 4, wherein responsive to remapping the memory address range, the PCH is to increment a second counter of completed memory remap operations.

6. The processing device of claim 5, wherein the PCH is to compare the second counter to a maximum allowed number of remap operations.

7. The processing device of claim 6, wherein the PCH is to continue with the remapping of the memory address range associated with a memory region among the plurality of regions in response to the completed memory remap operations count from the second counter being less than the maximum allowed number of remap operations.

8. The processing device of claim 6, wherein the PCH is to stop the remap of the memory address range associated with a memory region among the plurality of regions in response to the completed memory remap operations count from the second counter being greater than or equal to the maximum allowed of remap operations.

9. A system on a chip (SoC) comprising:
a memory; and
a processing device communicably coupled to the memory, wherein the processing device comprises:
a processing core; and
a platform controller hub (PCH) coupled to the processing core, the PCH to:
receive an indication of a failure associated with a first memory region of a plurality of memory regions residing in the memory;
generate a request to remap the first memory region;
interrupt, based on the request to remap, an operating system to prompt for a reboot; and
responsive to occurrence of the reboot, remap a memory address range associated with the first memory region to a second memory region of the plurality of regions.

10. The SoC of claim 9 wherein the PCH is to store an identifier of each of the plurality of the memory regions in the memory, wherein the identifier identifies the memory address range associated with each of the plurality of memory regions.

11. A method of a processing device comprising:
receiving an indication of a failure associated with a first memory region of a plurality of regions residing in a memory;
interrupting an operating system to prompt for a reboot; and
upon the reboot, remapping a memory address range associated with the first memory region to a second memory region of the plurality of regions.

12. The method of claim 11 further comprising storing an identifier of each of the plurality of the memory regions in the memory, wherein the identifier identifies the memory address range associated with each of the plurality of memory regions.

13. The method of claim 11 wherein upon receipt of the indication of failure, recording the request to remap the first memory region in the memory.

14. The method of claim 11 wherein upon receipt of the indication of failure, incrementing a first counter of memory remap requests.

15. The method of claim 14 further comprising in response to remapping the memory address range, incrementing a second counter of completed memory remap operations.

16. A non-transitory machine-readable storage medium including instructions that, when accessed by a processing device, cause the processing device to perform operations comprising:
receiving an indication of a failure associated with a first memory region of a plurality of regions residing in a memory;
generating a request to remap the first memory region;
interrupting, based on the request to remap, an operating system to prompt for a reboot; and
responsive to occurrence of the reboot, remapping a memory address range associated with the first memory region to a second memory region of the plurality of regions.

17. The non-transitory machine-readable storage medium of claim 16, wherein the operations further comprising storing an identifier of each of the plurality of the memory regions in the memory, wherein the identifier identifies the memory address range associated with each of the plurality of memory regions.

18. The non-transitory machine-readable storage medium of claim 16 wherein upon receipt of the indication of failure, the operations further comprising recording the request to remap the first memory region in the memory.

19. The non-transitory machine-readable storage medium of claim 16 wherein upon receipt of the indication of failure, the operations further comprising incrementing a first counter of memory remap requests.

20. The non-transitory machine-readable storage medium of claim 19 wherein in response to remapping the memory address range, the operations further comprising incrementing a second counter of completed memory remap operations.

* * * * *